United States Patent
Gruber et al.

(10) Patent No.: US 6,379,088 B1
(45) Date of Patent: Apr. 30, 2002

(54) MACHINE TOOL WITH INTERCHANGEABLE TIP FOR THE MACHINING OF PROFILED SEATS

(75) Inventors: Philippe Gruber, Grandvaux (CH); Renaud Viellard, Lucinges (FR)

(73) Assignee: Machines Serdi, Annecy (FR)

( * ) Notice: Subject to any disclaimer, the term of this patent is extended or adjusted under 35 U.S.C. 154(b) by 0 days.

(21) Appl. No.: 09/492,320

(22) Filed: Jan. 27, 2000

(30) Foreign Application Priority Data

Feb. 3, 1999 (FR) .............................. 99 01423

(51) Int. Cl.[7] .............................. B23B 41/00
(52) U.S. Cl. .................. 408/83.5; 408/224; 408/233; 408/713
(58) Field of Search .............. 408/83.5, 223, 408/224, 231, 233, 713, 238, 199

(56) References Cited

U.S. PATENT DOCUMENTS

| | | | | |
|---|---|---|---|---|
| 2,234,710 A | * | 3/1941 | Rottler ...................... | 408/83.5 |
| 3,728,940 A | | 4/1973 | Peterson | |
| 4,197,042 A | * | 4/1980 | Krhounek et al. .......... | 408/713 |
| 4,913,601 A | * | 4/1990 | Tenand et al. ............. | 408/83.5 |
| 5,454,667 A | * | 10/1995 | Cirino et al. ............... | 408/713 |
| 5,827,019 A | * | 10/1998 | Morrissey ................... | 408/713 |
| 5,863,161 A | * | 1/1999 | Tayne et al. ................ | 408/713 |

FOREIGN PATENT DOCUMENTS

| | | | | |
|---|---|---|---|---|
| DE | 41 24 646 A1 | | 1/1993 | |
| FR | 2643002 A1 | * | 8/1990 | ................ 408/83.5 |
| FR | 2766745 | | 2/1999 | |
| WO | WO 99/07508 | | 2/1999 | |

* cited by examiner

Primary Examiner—Daniel W. Howell
(74) Attorney, Agent, or Firm—Oliff & Berridge, PLC

(57) ABSTRACT

In a machine tool, a cradle of a bit holder is in the form of a rectangular trihedron and is inclined transversely about an axis of inclination corresponding to a generatrix of the conical bearing surface of a valve seat that has to be produced, while the cutting edges of the bit are produced from a blank having three bearing faces forming a rectangular trihedron, including a back face, a longitudinal face and a rear face, and another longitudinal face and a forward face of which, remaining in the as-produced state, are flanks with respect to the front face, a main cutting edge being produced so that its mid-point coincides with a reference point on the axis of inclination and lies on the axis of inclination at a constant distance from the vertex of the trihedron of the cradle.

12 Claims, 3 Drawing Sheets

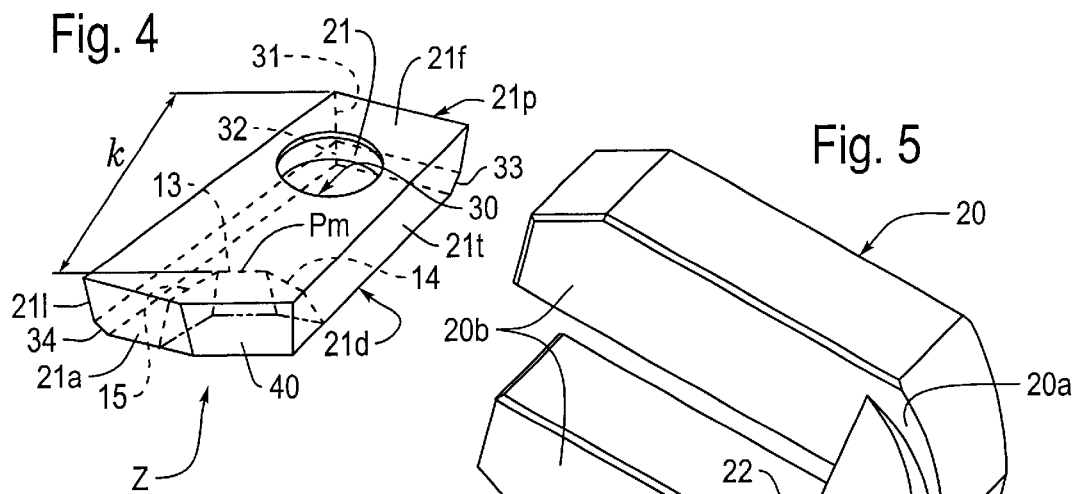
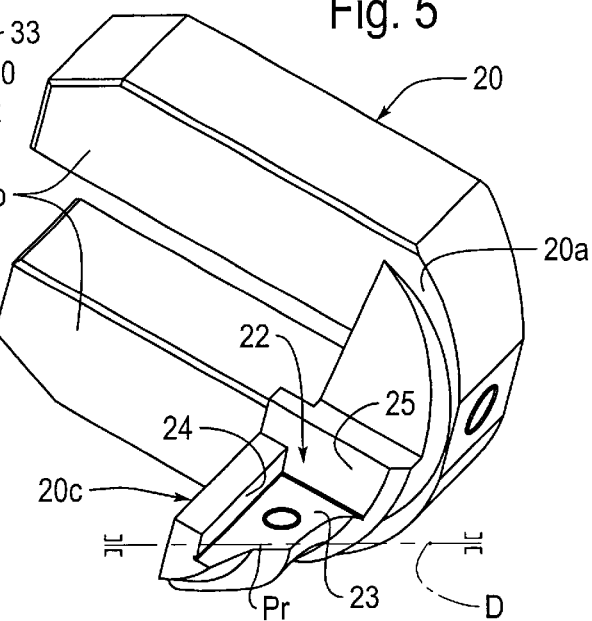
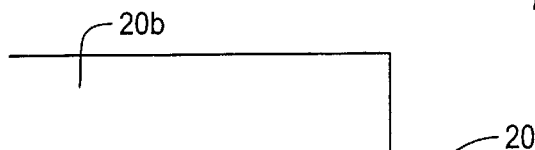
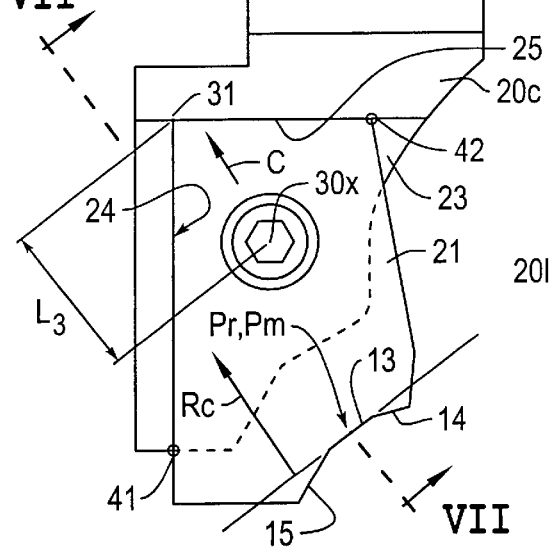
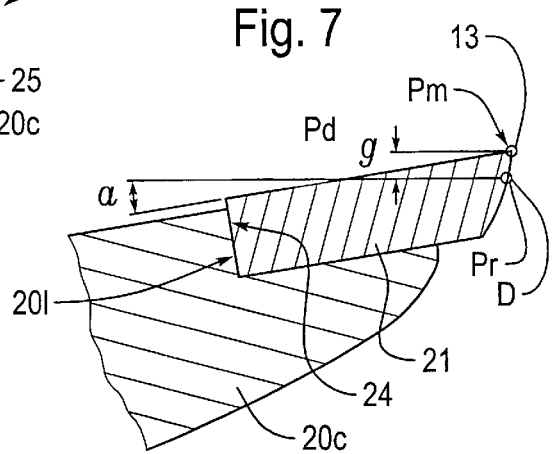

MACHINE TOOL WITH INTERCHANGEABLE TIP FOR THE MACHINING OF PROFILED SEATS

BACKGROUND OF THE INVENTION

The invention relates to a machine tool with an interchangeable bit for the machining of profiled bearing surfaces, and for example valve seats of internal-combustion engines.

Currently, such machining is carried out by a special machine equipped with a motorized spindle in which a tool holder is mounted. The tool holder 1, shown in the appended FIG. 1, is equipped on the one hand with an axial guide pin 2 for positioning it in the valve guide 3 of a cylinder head 4 and, on the other hand, with a bit holder 5 comprising two branches 5a which can be seen in FIG. 2. The latter are mounted so as to slide in the tool holder with the possibility of locking in the latter by screws 6. An arm 5b, approximately parallel to the axis of rotation of the spindle, carries a removable, multi-edged bit 7 used for machining a seat 8. FIG. 3 shows that, in current tool holders, the bit 7 has a wedge-shaped heel 10 and is fastened, by a screw 9, to a plane face 12 which, as shown in FIG. 2 is parallel to a diametral plane Pd of the tool holder.

The cutting profile of the bit 7 is matched to the shape of the seat that has to be machined and is defined by at least five parameters, namely, and as shown in FIG. 3:

the angle a of the main cutting edge 13 used for machining the conical bearing surface 8a on which the valve will bear, and therefore constituting the actual valve seat;

the width b of this seat;

the angle c of the cutting edge 14 for the upper clearance 8b of the seat 8;

the width d of this edge; and the angle e of the cutting edge 15 for the lower clearance 8c of the seat.

Because of the diversity of valve seats, there are thousands of bit types so that they are customized from blanks, for example made of sintered tungsten carbide, the profiling of which is carried out as required. This profiling also comprises the forming of the clearance angle f, shown in FIG. 2.

To allow the cutting edges of these bits to be subsequently reground, without having to use a special grinding machine, the two large faces, namely the front face 7a and back face 7b respectively, of the bits are plane and parallel. This allows the cutting edges to be ground by grinding the front face 7a. Finally, in order to prevent this grinding from moving the cutting edges outside the diametral plane Pd, it is common practice for the bearing face 12 of the bit holder to be positioned so that the cutting edges of a new bit are short of this diametral plane, that is to say are in front of the latter, by an amount of about 0.5 to 0.8 mm, as shown by the amount g in FIG. 2.

This method of renovation, which has hitherto proved satisfactory, reaches its limits because, on the one hand, of the increase in hardness of the seats and, on the other hand, of the impossibility of using the high cutting speeds allowed by carbide bits.

This is because, in order to better withstand the additives in current fuels, the valve seats are manufactured from increasingly harder alloys which are difficult to machine, such as alloys based on carbon, chromium, vanadium, nickel, silicon and manganese.

Moreover, the surface hardness of the seats is increased by the peening of the seat by the valve and by the increase in exhaust gas temperatures. This increase in hardness cannot be compensated for by an increase in cutting speed, as is known in other fields, for the following reasons:

renovation of the seats is carried out dry and the guide pin which rotates in the valve guide, with a small clearance, runs the risk of seizing if it is driven at high speeds;

the structure carrying the tool is not designed for these speeds and, in particular, lacks rigidity, especially when the cutting forces are high because of the length of the cutting profiles.

This lack of rigidity derives from the vertical height of the bit holder with respect to the bearings for guiding the motorized spindle, but also from the mounting of the bit on the bit holder and from the mounting of the bit holder on the tool holder, the effects of the latter being greater due to the radial offset of the bit holder with respect to the axis of rotation of the spindle.

FIG. 3 shows that, in the current arrangements, the resultant Rc of the reactions to the cutting forces being exerted on the various cutting edges 13, 14 and 15 is very often outside the point 17a where the heel of the bit bears on the bit holder. If, as shown in this figure, the manufacturing tolerances, of the angles of the heel and of the angles of the faces of the bit holder serving for supporting the heel respectively, are at their limiting values, that is to say are under unfavorable conditions, the heel bears only on two points 17a, 17b and may allow the bit to pivot in the direction of the arrow 18, due to the couple applied to it by the resultant Rc. This consequently modifies the position of the cutting edges, impairing precision, but also encourages vibration and impairment of the surface finish of the machined faces. It should be noted that this pivoting can occur all the more readily as the back of the bit bears on a plane face.

DE-A-4 124,646 describes a machine tool, with an interchangeable tool for machining profiled parts, in which each tool, on the one hand, carries two opposed bits bonded onto the latter and, on the other hand, has a straight heel and mutually parallel bearing faces parallel to the longitudinal axis of the bit, these faces defining, in cross section, a "V"-shaped back profile complementary to that produced in a cradle of the tool holder against which said tool is fastened by a screw passing through it.

This way of mounting the tool in the tool holder improves the rigidity of their connection but complicates the regrinding of the bits bonded onto the tool. Moreover, with this tool profile, and whether the regrinding operation is carried out on the cutting face or on the flank, this operation automatically involves having to modify the cutting profile, and therefore the profile of the seat machined.

SUMMARY OF THE INVENTION

The object of the present invention is to remedy these drawbacks by providing a machine tool in which the positioning and the fastening of the bit to the bit holder increase the stiffness and guarantee the geometrical positioning of the cutting profile, both after the first grinding and after regrinding, and therefore guarantee the precision with which the profiled part is machined, while still allowing the same bit to be reground several times by the usual, simple, inexpensive means available in any mechanical machining workshop.

For this purpose, in the machine tool according to the invention, the cradle of the bit holder is in the form of a rectangular trihedron and is inclined transversely by rotation about an axis corresponding to a generatrix of the conical bearing surface of the seat that has to be produced, while the cutting edges of the bit are produced from a blank having three bearing faces forming a rectangular trihedron, namely the back face, a longitudinal face and the rear face, the last two being as-sintered, and the other longitudinal face and the forward face of which, remaining in the as-produced state, are flanks with respect to the front face, the main cutting edge being produced so that its mid-point coincides with a reference point on the axis of inclination of the cradle and lies on this axis at a constant distance from the vertex of the trihedron of the cradle.

With this arrangement, when the bit is positioned in its cradle and fastened by a through-screw, the bearing of its three bearing faces against the faces of the trihedron of the cradle, under the action of the horizontal components of the clamping force of the screw, ensures that the bit and its cutting edge are perfectly positioned.

By virtue of the longitudinal face of the cradle which extends over almost the entire length of the bit, the resultant of the reactions to the cutting forces always lies between the bearing regions of the bit and therefore does not tend to make it pivot about its fastening, thereby guaranteeing that the cutting edges are correctly positioned.

Furthermore, the inclination of the cradle has the advantage, while using bits with parallel, respectively front and back, faces, and therefore easily regrindable bits, of giving the main cutting edge and inclination providing a grinding rake, without thereby modifying the position in space of this preferred edge, and therefore the geometry of the machining of the corresponding bearing surface.

It will be noted that, although the other, nonpreferred, cutting edges have a position in space which is modified, because of their pivoting about the reference edge and not about their own edge, these modifications are not of the type to exceed the manufacturing tolerances, which are generally wider, assigned to the bearing surfaces that they are intended to machine.

The fact of giving a grinding rake, by transversely inclining the cradle, makes it possible to reduce the cutting forces and consequently the reaction forces affecting the rigidity of the bit holder and of the tool holder, but also and above all that of the spindle quill with respect to the spindle bearings.

Finally, the precise positioning, right from the machining for adapting the blank, of the mid-point of the main cutting edge makes it possible to guarantee the precision of the machining by the bit, while reducing the number of bit-holder models, the latter then not being differentiated except by the angle of inclination, with respect to the axis of rotation of the tool holder, of the generatrix of the main bearing surface of the seat that has to be machined.

In one embodiment of the invention, the cradle is provided, in at least the two lower edges of its trihedron, with a clearance groove while the lower edges of the trihedron of the bit are broken by an as-sintered chamfer.

This arrangement makes it possible, despite there being no machining on the longitudinal and rear bearing faces of the bit, to guarantee that this bit is correctly positioned by the cradle.

The invention also relates to a multi-edged interchangeable cutting bit for the machining of valve seats, in which the cutting edges are produced, on a case by case basis by grinding, from a universal blank, for example made of sintered tungsten carbide, preground on its two parallel large faces, namely the back and front faces respectively, and having a through-bore for the passage of a countersunk fastening screw.

According to the invention, the cutting edges are produced from a blank which has, seen from above, the shape of a rectangular trapezoid and, in a region which, bounded between two as-sintered faces, and as flanks, namely the longitudinal and forward faces respectively, is diagonally opposite a rectangular positioning trihedron formed by a longitudinal face, a rear face and the back face.

BRIEF DESCRIPTION OF THE DRAWINGS

Further features and advantages will emerge from the description which follows, with reference to the appended schematic drawing showing, by way of example, one embodiment of the machine tool according to the invention.

FIG. 4 is a perspective view, on an enlarged scale, of one embodiment of a bit blank according to the invention.

FIG. 5 is a perspective view of the bit holder according to the invention, without the bit.

FIG. 6 is a partial view, in front elevation, of the bit holder equipped with a bit.

FIG. 7 is a partial sectional view on VII—VII in FIG. 6 showing, on an enlarged scale, the positioning of the main cutting edge with respect to the diametral mid-plane of the bit holder.

FIG. 9 is a partial sectional view showing, on an enlarged scale, the cup made in the bit for the head of the fastening screw to bear on.

DETAILED DESCRIPTION OF PREFERRED EMBODIMENTS

Figure 1:
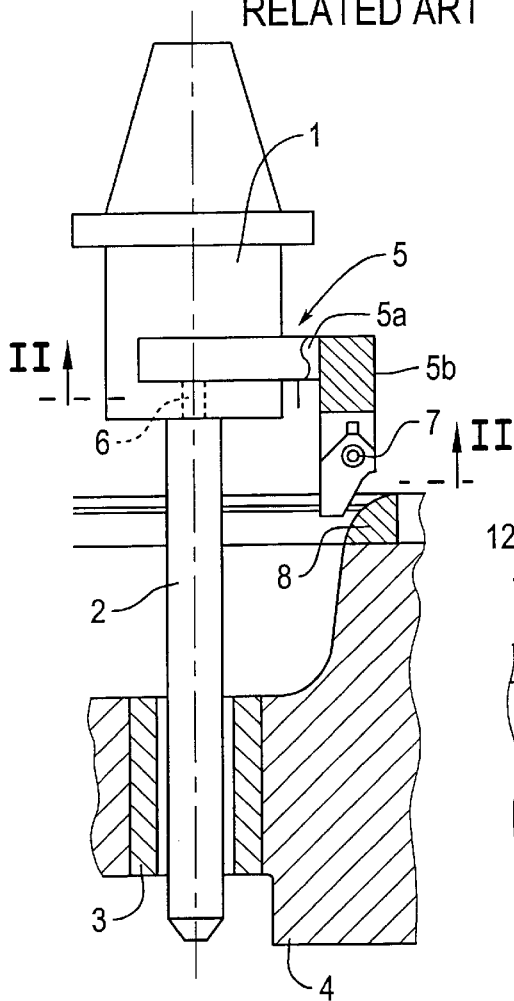
FIG. 1 is a partial view, in partial section, showing a tool holder of the prior art when it is in place in a cylinder head in order to renovate a seat.
Figure 3:
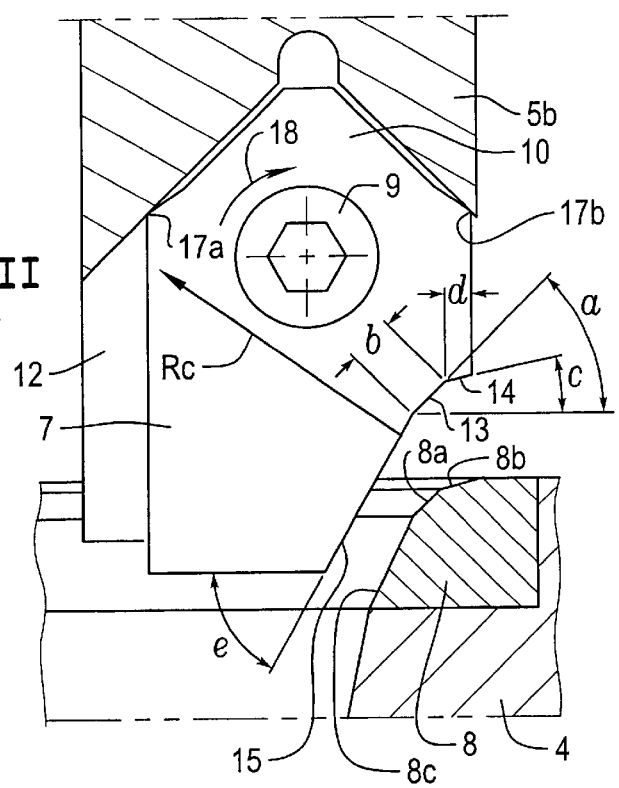
FIG. 3 is a partial cross-sectional view showing, on an even larger scale, the particular shape of the machining bits of the prior art.
Figure 2:
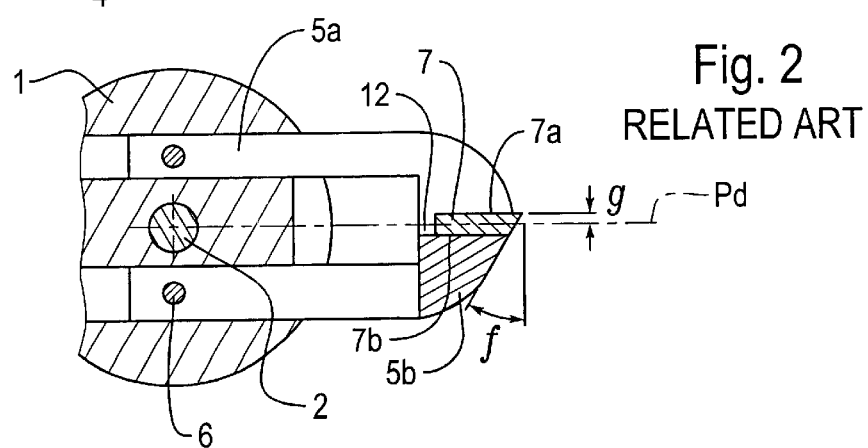
FIG. 2 is a sectional view on II—II in FIG. 1, showing, on an enlarged scale, the bit holder of the prior art.

The machine tool according to the invention is therefore composed, as in the prior art, of a bit holder 20 and a bit 21. The bit holder is composed of a body 20a, integral with two transverse branches 20b capable of interacting with the tool holder 1, and of an approximately longitudinal arm 20c projecting downward and having a cradle 22 capable of accommodating and positioning the bit 21.

Figure 8:
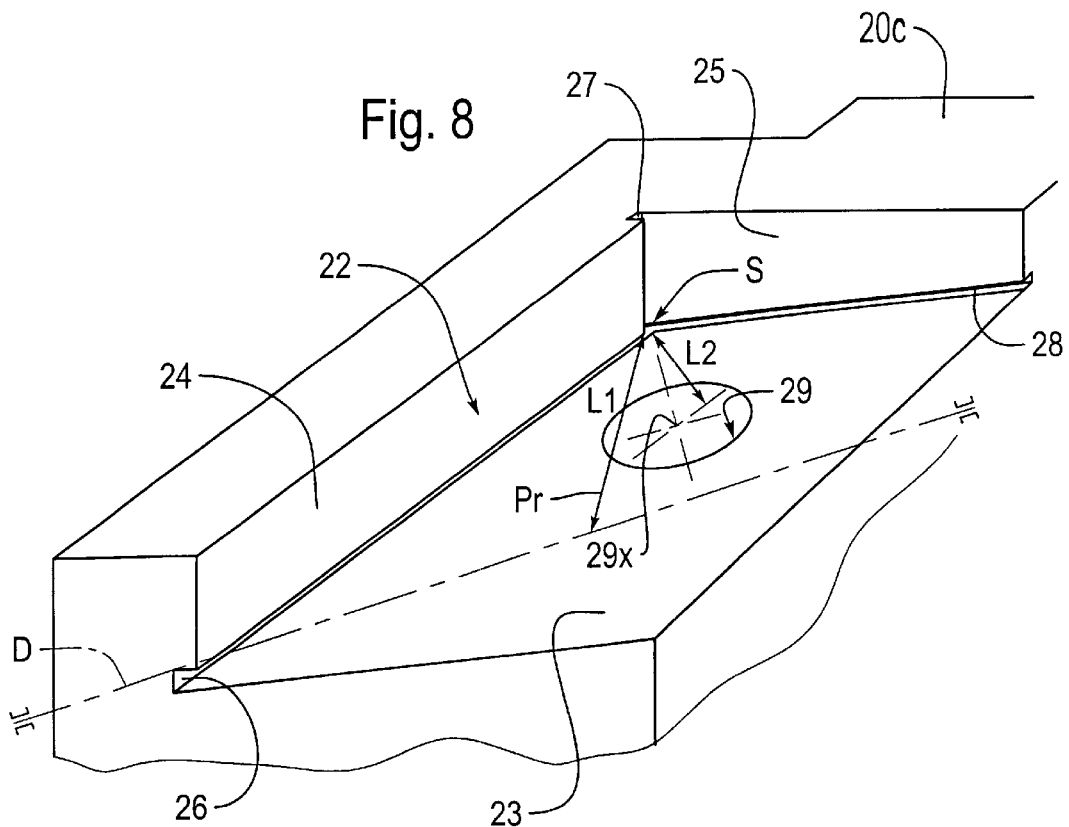
FIG. 8 is a partial view showing, in perspective and on an enlarged scale, the cradle of the bit holder.

According to the invention, and as shown in more detail in FIGS. 5 and 8, this cradle 22 is in the form of a rectangular trihedron bounded in pairs by three perpendicular faces, namely a bottom face 23, a longitudinal face 24 and a forward face 25. The entire cradle is inclined with respect to an axis D which corresponds to one of the generatrices of the conical bearing surface that has to be machined with the bit holder and which is therefore inclined with respect to the axis of rotation of the tool holder by the same angular value as the conical bearing surface of the seat that has to be produced. In FIG. 8, the reference Pr denotes a reference point on this axis of inclination. This point is at a distance L1 from the vertex S of the bearing trihedron of the cradle 22.

FIG. 8 shows that the edges of the trihedron are replaced by clearance grooves 26, between the faces 23 and 24, 27, between the faces 24 and 25, and 28, between the faces 23 and 25, respectively.

Emerging from the bottom face 23 is a threaded bore 29 whose longitudinal axis 29x is orthogonal to this face and is at a distance L2 from the vertex S of the trihedron.

As shown in FIG. 4, the bit 21 is produced from a blank, for example made of sintered tungsten carbide, comprising:

two parallel large faces, namely a back face 21d and a front face 21f;

three bearing faces defining a rectangular trihedron, that is to say faces which are perpendicular to each other in pairs, namely the back face 21d, a longitudinal face 2l and a forward face 21a; and two flanks with respect to the front face 21f; namely the forward face 21a and the other longitudinal face 21t.

FIG. 4 shows that the longitudinal face 21t moves away from the other longitudinal face 21l, going from the rear face 21p to the forward face 21a, giving the bit a rectangular trapezoidal shape seen from above.

Passing through the bit 21 is a smooth bore 30 with a bearing cup 32 for the conical head 35a of a screw 35 (FIG. 6). As shown in FIG. 6, the longitudinal axis 30x of this bore 30 is orthogonal to the large faces, namely the back face 21d and front face 21f respectively, of the bit 21 and lies at a distance L3 from the edge 31 of the bit and therefore from the vertex of its trihedron. The difference L3–L2 is about 0.08 to 0.025 mm and therefore a few tenths of a millimeter.

Figure 9:
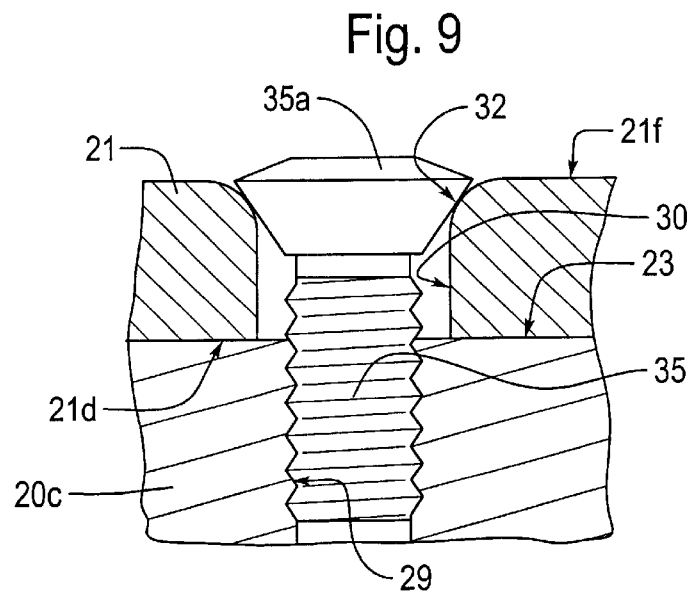

Moreover, and as shown in FIG. 9, the cup 32 has, in its part which accommodates the bearing surface of the head 35a of the screw, a convex bearing face formed by a fillet. By virtue of the latter, the conical head 35a of the screw 35 always bears on the bit 21 via a continuous circle and any cantilevering is eliminated. Furthermore, the screw 35/bore 30 eccentricity (L3–L2) provides a transverse component pressing the trihedron of the bit 21 in that of the cradle 22.

FIG. 4 shows that the region Z in which the cutting edges are produced is diagonally opposite the bearing trihedron of the bit and is bounded between the longitudinal face 21t and the forward face 21a, respectively. The main edge 13, used for machining the actual seat, and the edges 14 and 15 forming the clearances, namely the upper and lower clearances respectively, shown in dot-dashed lines in FIG. 4, are produced on a case by case basis by grinding, after the two faces, namely the front face 21f and the back face 21d respectively, have been ground in order to guarantee that they are perfectly parallel.

To reduce the losses of material and the manufacturing and machining costs, the region Z of each bit has a flat 40 truncating the corner.

When producing the main edge 13, the latter is positioned in the blank so that its mid-point Pm (FIG. 4) is at a constant distance K from the edge 31 formed between the rear face 21p and the longitudinal bearing face 21l. As should be appreciated, the constant distance K is measured in the plane of the front face 21f of the plate, which face is parallel to back face 21d, between point Pm and the trace of edge 31 in this plane.

Each of the lower edges of the bit, that is to say those formed between the back face 21d and, respectively, the rear face 21p and the longitudinal face 21l, is broken by an as-sintered chamfer, respectively 33 and 34.

Finally, at least the lower part of the cradle 22 is narrower than the bit 21 so that, when this bit is placed on the latter, it projects therefrom on the opposite side from its longitudinal bearing face 24, and over most of its length.

It is apparent from the foregoing that, because of its simple shape, the blank is very easy to produce and is therefore inexpensive and above all has stable geometrical characteristics which allow it to be used without machining operations, other than those necessary for forming the cutting edges. This therefore allows these bearing faces to be placed in the as-produced state in the trihedral cradle.

When the bit has been put in position, these bearing faces come into contact with the facing ones of the cradle, this being all the easier because the edges that might disturb this positioning are replaced by the chamfers 33 and 34 and by the clearance grooves 26 to 28. When the screw 35 is tightened, the bearing of its conical head on the cup 32 of the bit generates, on the bit, and by virtue of the eccentricity L3–L2, a transverse component C which tends to press the bearing faces, namely the rear face 21p and the side face 21l respectively, against the corresponding faces 24 and 25 of the cradle and guarantee that this bit, and therefore its cutting edges, are properly positioned.

By virtue of this positioning, the point Pm on the cutting edge 13 coincides with the reference point Pr on the axis of inclination D unless, as shown in FIG. 7 corresponding to the positioning of a new bit, the cutting edges of which are in front of the diametral plane Pd, the point Pm will substantially superpose the point Pr.

It should be mentioned that the offset g in FIG. 7 is deliberately exaggerated and that the radial offset between the points PM and Pr is in practice insufficient to modify, beyond the accepted values, the position of the main cutting edge 13, and for example if of the order of 0.5 mm.

FIG. 7 shows that the inclination of the cradle about the angle of inclination D, at an angle a having a value of between 6 and 15°, gives the edge 13 a grinding rake which makes it possible to reduce the cutting force and therefore the forces imposed on the bit, it being possible for the peening to reduce its rigidity but also to reduce the power needed for the machining.

Finally, FIG. 6 shows that, by virtue of the precise positioning of the cutting edges, the resultant Rc of the reactions to the cutting forces, the reactions being defined in the preamble, is between the extreme points 41, 42 where the bit bears on the cradle 22 and, consequently, there is no tendency for the bit to tilt or pivot.

It is apparent from the foregoing that the bit holder and the bit according to the invention constitute a machine tool which considerably improves the conditions for machining profiled cylindrical bearing surfaces and makes it possible, even with the strongest materials, to work under better precision and surface-finish conditions, while improving the centering precision of the machining with respect to the virtual axis of the seat.

The machine tool that has been described in the case of its application to the machining and renovating of valve seats with positioning of the spindle by means of a guide pin, applies, of course, to any other machining, with or without positioning by a guide pin and employing an interchangeable bit fastened in a tool holder, which may or may not be adjustable, that is to say one which is attached to a tool holder or formed in the tool holder.

Likewise, the formation of the grinding rake by tilting the cradle applies to any bit whose cutting profile is defined by one or more cutting edges and of which one of these edges may be preferred for defining the tilt axis.

What is claimed is:

1. A multi-edged interchangeable cutting bit for the machining of a valve seat, comprising:

a blank preground on parallel back and front faces, the blank having the shape of a rectangular trapezoid and including a rectangular positioning trihedron formed by three faces, including the back face, a rear face, and a first longitudinal face, the multi-edged interchangeable cutting bit further including a through-bore for the passage of a countersunk fastening screw with a conical head and at least one main cutting edge, for producing a conical bearing surface of the valve seat, with the main cutting edge diagonally opposite the rectangular positioning trihedron, the region formed by a second longitudinal face opposite to the first longitudinal face and a forward face opposite to the rear face, wherein a distance between the second longitudinal face and the first longitudinal face increases in a direction from the rear face to the forward face, and the blank is formed of sintered tungsten carbide after the first longitudinal face and the rear face of the rectangular positioning trihedron of the blank are formed.

2. The bit as claimed in claim 1, wherein the through-bore passes through the front and back faces and the front face has a convex bearing surface formed by a fillet.

3. The bit as claimed in claim 1, wherein the bit further comprises at least one additional cutting edge, for producing at least one of an upper and a lower clearance of the valve seat, formed by grinding the blank in the region including the at least one main cutting edge.

4. A machine tool with an interchangeable bit for machining a valve seat, comprising:
   a bit holder radially adjustably mounted on a tool holder of a motorized spindle, the bit holder including a substantially longitudinal lower arm including a cradle for the interchangeable bit, the interchangeable bit including at one end at least one main cutting edge for producing a conical bearing surface of the valve seat and at the other end a rear bearing face orthogonal to a longitudinal axis of the interchangeable bit, the bit having parallel back and front faces and fastened to the cradle by a countersunk transverse screw, wherein the cradle of the bit holder is in the form of a rectangular trihedron and is inclined transversely about an axis of inclination corresponding to a generatrix of the conical bearing surface of the valve seat, and a midpoint of the at least one main cutting edge coincides with a reference point on the axis of inclination, which is at a specific and constant distance from a vertex of the trihedron of the cradle, and lies on the axis of inclination so that the reference point is at a constant distance from the vertex of the trihedron of the cradle in a plane containing the reference point and the vertex.

5. The machine tool as claimed in claim 4, wherein a first distance between a longitudinal axis of a bore of the interchangeable bit and the vertex of the rectangular trihedron of the cradle is larger than a second distance between a longitudinal axis of a threaded bore of the bit holder for the transverse screw for fastening the interchangeable bit and the vertex of the rectangular trihedron of the cradle.

6. The machine tool as claimed in claim 5, wherein the first distance is between about 0.025 mm to 0.08 mm larger than the second distance.

7. The machine tool as claimed in claim 4, wherein the interchangeable bit is formed from a blank having three bearing faces forming a rectangular positioning trihedron, the three bearing faces including the back face, the rear bearing face, and a first longitudinal face.

8. The machine tool as claimed in claim 7, wherein the blank is formed of sintered tungsten carbide.

9. The machine tool as claimed in claim 7, wherein at least two lower edges of the rectangular trihedron of the cradle include a clearance groove and at least two lower edges of the rectangular positioning trihedron of the interchangeable bit include a chamfer.

10. The machine tool as claimed in claim 7, wherein the interchangeable bit further comprises at least one additional cutting edge for producing at least one of an upper clearance and a lower clearance of the valve seat.

11. The machine tool as claimed in claim 10, wherein the at least one main cutting edge and the at least one additional cutting edge are formed in the blank in a region diagonally opposite the rectangular positioning trihedron, the region formed by a second longitudinal face opposite to the first longitudinal face and a forward face opposite to the rear bearing face.

12. The machine tool as claimed in claim 9, wherein the blank is formed of sintered tungsten carbide and the chamfers in the lower edges of the rectangular positioning trihedron are formed in the blank prior to sintering.

* * * * *